United States Patent

[11] 3,580,544

| [72] | Inventor | Arthur Albert Payne<br>Birmingham, England |
|---|---|---|
| [21] | Appl. No. | 774,067 |
| [22] | Filed | Nov. 7, 1968 |
| [45] | Patented | May 25, 1971 |
| [73] | Assignee | Girling Limited,<br>Birmingham, England |
| [32] | Priority | Nov. 10, 1967 |
| [33] | | Great Britain |
| [31] | | 51255/67 |

[54] TOOL FOR USE WITH DISC BRAKES
5 Claims, 5 Drawing Figs.

[52] U.S. Cl. .................................................. 254/131
[51] Int. Cl. .................................................. B66f 3/00
[50] Field of Search ....................................... 254/131;
188/1; 81/1, 3, 119, 125.1, 90—3, 90—7; 29/180,
183, 183.5, 190, 193

[56] References Cited
UNITED STATES PATENTS

| 532,634 | 1/1895 | Billings ........................ | 76/114UX |
| 1,463,077 | 7/1923 | Gandell ........................ | 81/90 |

Primary Examiner—Othell M. Simpson
Assistant Examiner—David R. Melton
Attorney—Scrivener, Parker, Scrivener & Clarke ABSTRACT: A tool for pushing back a piston in a cylinder of a disc brake comprises a bar of substantial length. The opposed end edges of the bar are of outwardly convex section and the dimensions between these edges is greater than the thickness of the bar between opposed sides. The dimensions between the opposed end edges correspond to the distances between the disc of a disc brake and the inner end of the piston when the piston is fully retracted, and the distance between the sides of the bar is slightly less than the space between the piston and the disc left after removal of a friction pad assembly.

Patented May 25, 1971 3,580,544
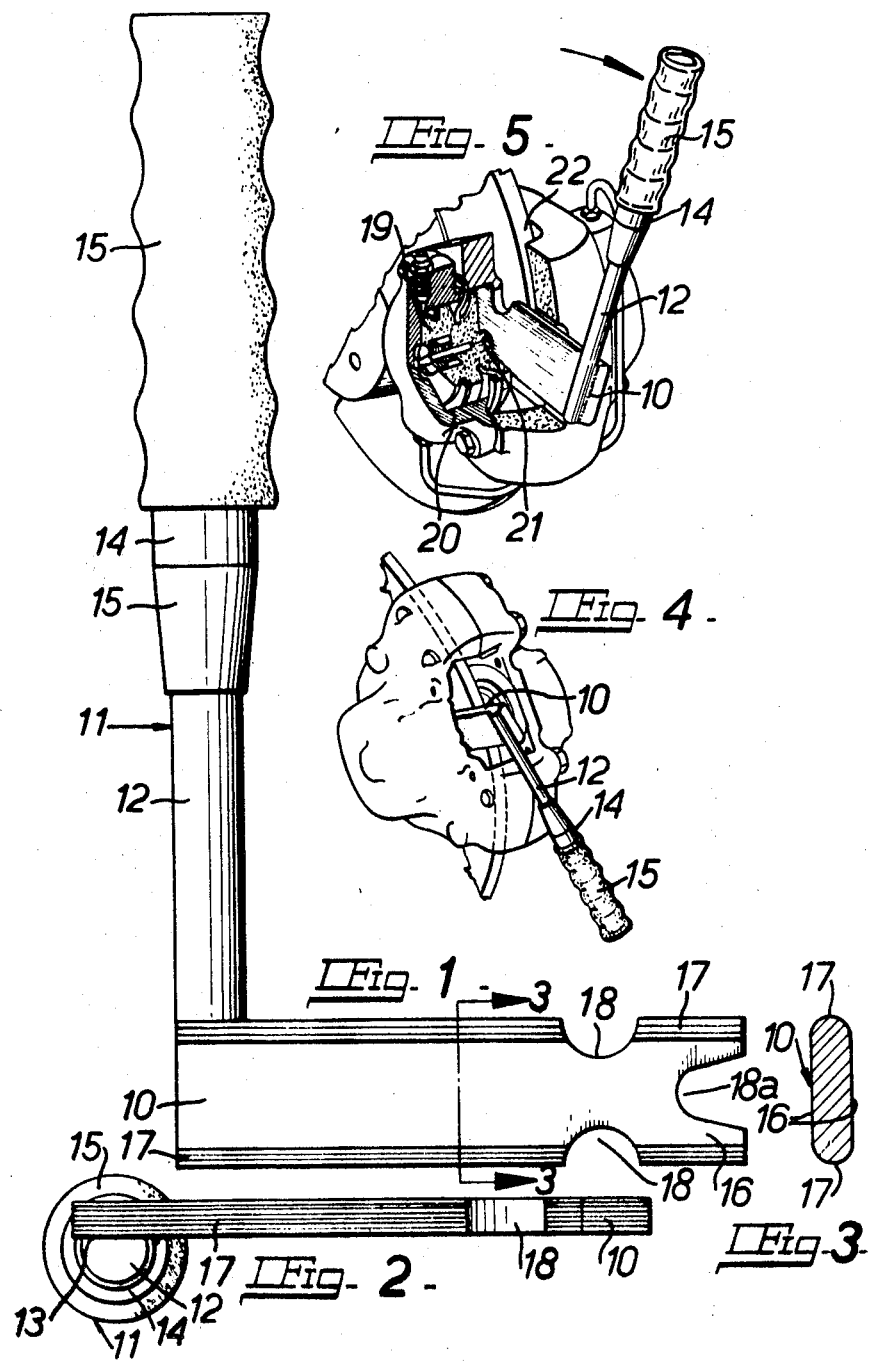

TOOL FOR USE WITH DISC BRAKES

This invention relates to a new or improved tool for use with disc brakes of the caliper type in which a caliper straddles a portion of periphery of a rotating disc and one or each limb in the caliper houses or carries an hydraulic cylinder in which works a piston adapted to urge a friction pad into engagement with the adjacent face of the disc.

The friction pad is usually bonded to a backing plate which is engaged by the inner end of the piston, and when the friction pad has worn down to a thickness such that it has to be replaced the piston has been advanced out of the cylinder so far that its inner end occupies a part of the space into which a new friction pad assembly has to be inserted. The piston has therefore to be pushed back into the cylinder against the hydraulic pressure in the fluid pipeline. In the absence of a suitable tool this has been done with a screwdriver or like tool as a prising lever. Where the piston is of cup shape, its inner end being in the form of a relatively narrow annulus, a screwdriver or like tool can only be applied to the edge of the piston which tends to tilt the piston and causes it to become wedged in the cylinder, and there is a risk of the edge of the piston being damaged. Furthermore, if the piston becomes wedged in the cylinder, the force applied to it from the screwdriver has to be increased to force the piston back. This in turn increases the risk of the edge of the piston being damaged.

One object of our invention is to provide an improved tool which overcomes these difficulties.

According to our invention a tool for use in pushing back a piston in a cylinder of a disc brake of the kind set forth comprises a bar of substantial length and of which a first cross section dimension between opposed sides is such that the bar can be inserted into the space between the piston and the disc left by the removal of the friction pad assembly, and opposed end edges of the bar are of outwardly convex section of which the cross-sectional dimension in a direction normal to the first and passing through the midpoint thereof is at least equal to the distance between the disc and the inner end of the piston when the piston is in a fully retracted position whereby on angular movement of the bar about its main axis the piston can be pushed back into the cylinder.

Preferably there is a rolling engagement between a convex end edge of the bar and an adjacent surface of the piston when the bar is moved angularly.

By moving the tool relative to the disc in a direction tangential to the direction in which it is moved angularly ensures that there is a pure rolling engagement between the piston and the adjacent convex end edge of the bar as the other convex end edge of the bar slides relative to the surface of the disc with which it engages. This removes substantially all possibility of the piston being damaged.

Preferably the tool is inserted between the piston and the disc in a position passing through and generally normal to the axis of the piston. This has the advantage that when the toll is moved angularly about its axis the retraction force which it applies to the piston due to the rolling engagement acts substantially along the centerline of the piston and there is no tendency for the piston to become wedged in its cylinder.

Preferably the tool is provided at one end with a handgrip portion to facilitate the angular movement of the bar about its main axis.

One embodiment of our invention is illustrated in the accompanying drawings in which:

FIG. 1 is a side elevation of a tool for pushing back a piston in a cylinder of a disc brake;

FIG. 2 is a view of one end of the tool;

FIG. 3 is a section on the line 3—3 of FIG. 2;

FIG. 4 is a perspective view of the tool in its position of use in a disc brake embodying a hollow piston; and FIG. 5 is a perspective view of the tool in its position of use in a disc brake embodying a solid piston having a central axially extending spigot for engagement in a complementary opening in a friction pad assembly which piston is adapted to apply to a rotatable disc.

The tool illustrated in the drawings comprises a bar 10 of a length substantially greater than the diameter of a piston in a disc brake. The bar 10 is secured, such as by welding, to the inner end of a handle assembly 11.

The handle assembly 11 comprises a solid cylindrical member 12 formed at one end with a machined flat 13 of a length equal to the width of the bar 10 and against which one end of the bar 10 is secured in a position such that the bar 10 projects from one side of the member 12 is a direction substantially normal to the main axis of the member 12.

The member 12, for a substantial length terminating at its end remote from the bar 10, is enclosed within a cylindrical sleeve 14 which is progressively reduced in diameter adjacent to its inner end to form a frustoconical portion 15 which has a minimum external diameter slightly greater than that of the member 12.

A hand grip in the form of a sleeve 15 having a closed outer end encloses a portion of the sleeve 14 and terminates at its inner end at a point spaced outwardly from the frustoconical portion 15.

The bar 10 is provided with a pair of parallel side are of 16 which are spaced apart by a distance slightly less than the spacing between a piston and a disc in a disc brake after removal from the brake of a friction pad assembly adapted to be applied to the disc by the piston.

A pair of parallel end edges 17 of the bar 10 are of outwardly convex section and the cross-sectional diametrical dimension between the edges 17 is at least equal to the distance between and the inner end of the piston when the piston is in a fully retracted position. In this position, a new friction pad assembly can be inserted in the space between the piston and the disc.

Aligned opposed recesses 18 of concave outline are formed in the end edges 17 of the bar 10 at an intermediate point in the length of the bar. An open ended recess 18a is formed in the edge of the bar 10 remote from the handle assembly to form a claw lying on the main axis of the bar.

When the tool is to be used for pushing back a hollow piston in a cylinder of the caliper type disc brake illustrated in FIG. 4, after removal of a friction pad assembly, the bar 10 is inserted into the space between the disc and the outer end of the piston and overlies the external diameter of the piston with the opposed side faces 16 of the bar in substantial contact with aligned faces of the piston and the disc.

The bar 10 is moved angularly about its main axis by angular movement of the handle assembly in a plane normal to the plane of the bar. Preferably there is a rolling engagement between the piston and the adjacent convex end edge 17 of the bar with which it engages, and the other convex end edge slides relative to the disc.

The tool can also be used with a caliper type disc brake of the kind illustrated in FIG. 5. The disc brake comprises a solid piston 19 working in a hydraulic cylinder 20 and having an axial projection 21 of a diameter less than that of the piston and of part conical form. The projection is adapted to be received in a complementary notch in a friction pad assembly which that piston is adapted to apply to a rotatable disc 22. After removal of the friction pad assembly, the bar 10 of the tool is inserted into the space between the piston and the disc in a position such that the axial projection 21 is received within one of the opposed recesses 18 which is located at a suitable position to enable the bar to overlie the piston. The bar 10 is then moved angularly by angular movement of the handle assembly 11 as described above to push back the piston into the cylinder 20 and away from the disc.

Since a clearance exists between the base of the recess 18 and the projection 21, there is no tendency for the projection to be damaged by the bar during the angular movement of the tool.

Since a recess 18 is provided in each convex edge of the bar 10, the tool can be rotated in either a clockwise or counterclockwise direction without touching the projection.

For some applications it is convenient for the projection 21 to be straddled by the claw formed between the open-ended recess 18a and opposed end edges 17 of the bar 10.

I claim:

1. A tool for use with a disc brake of the caliper type comprising a rotatable disc, a caliper incorporating opposed limbs straddling a portion of the periphery of said disc, friction pads for engagement with opposed faces of said disc located in said caliper and a piston for applying a friction pad to said disc working in a limb of said caliper, said tool comprising an elongate bar having a pair of opposed side edges, a pair of opposed side faces and a pair of end edges and having a working length extending from one end edge of said bar towards the other end edge, and a handle of substantial length located adjacent to said other end face and extending transversely of said bar, said bar having at least over its working length a first cross-sectional dimension between opposed side faces less than the width of the space between said caliper and said disc left by removal of a friction pad so that said bar can be inserted into said space after removal of a friction pad, said working length being such that when said bar is inserted into said space said working length can extend at least over the full diameter of said piston, and said opposed side edges of said bar having outwardly convex sections and the cross-sectional dimension of said bar in a direction normal to the first cross-sectional dimension and passing through the midpoint thereof being at least equal to the distance between said disc and said piston when said piston is in a fully retracted position, whereby when said bar is inserted into said space a turning moment about the longitudinal axis of said bar can be applied through said handle to move said bar angularly about its longitudinal axis and push back said axis into a fully retracted position.

2. A tool as claimed in claim 1 wherein said side edges are parallel at least over said working length whereby said bar is inserted in said space and moved angularly about its longitudinal axis there is a rolling engagement between one convex side edge and said piston and a sliding engagement between the other convex said edge and said disc.

3. A tool as claimed in claim 1 wherein at least one edge of said bar is formed with a recess to receive an axially extending projection at the inner end of said piston, which projection is adapted to be received in a complementary recess in a friction pad incorporated in the disc brake.

4. A tool as claimed in claim 3 wherein said opposed side edges o said bar are formed with aligned opposed recesses.

5. A tool as claimed in claim 3 wherein said one edge of said bar is formed with a recess.